(12) United States Patent
Kanazawa et al.

(10) Patent No.: US 10,001,375 B2
(45) Date of Patent: Jun. 19, 2018

(54) SENSOR DEVICE

(71) Applicant: DENSO CORPORATION, Kariya, Aichi-pref. (JP)

(72) Inventors: Takeru Kanazawa, Kariya (JP); Minekazu Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 144 days.

(21) Appl. No.: 15/203,947

(22) Filed: Jul. 7, 2016

(65) Prior Publication Data
US 2017/0016727 A1    Jan. 19, 2017

(30) Foreign Application Priority Data

Jul. 14, 2015 (JP) ................. 2015-140824

(51) Int. Cl.
| | |
|---|---|
| G01C 19/5719 | (2012.01) |
| G01P 15/125 | (2006.01) |
| G01C 19/574 | (2012.01) |
| G01P 15/08 | (2006.01) |

(52) U.S. Cl.
CPC ....... *G01C 19/5719* (2013.01); *G01C 19/574* (2013.01); *G01P 15/125* (2013.01); *G01P 2015/0814* (2013.01)

(58) Field of Classification Search
CPC ........... G01C 19/5719; G01C 19/5733; G01C 19/5755; G01C 19/5762; G01C 19/5769; G01P 15/125; G01P 2015/0814
See application file for complete search history.

(56) References Cited

U.S. PATENT DOCUMENTS

| | | | |
|---|---|---|---|
| 2002/0051258 A1 | 5/2002 | Tamura | |
| 2009/0071247 A1* | 3/2009 | Konaka | ............... G01C 19/574 73/504.14 |
| 2011/0036167 A1 | 2/2011 | Ohkoshi | |
| 2014/0020466 A1 | 1/2014 | Ohkoshi | |
| 2014/0150552 A1* | 6/2014 | Feyh | .................. G01C 19/5755 73/504.12 |
| 2014/0352430 A1 | 12/2014 | Ohkoshi | |

FOREIGN PATENT DOCUMENTS

JP    2014-157063 A    8/2014

* cited by examiner

*Primary Examiner* — John Fitzgerald
*Assistant Examiner* — David Z Huang
(74) *Attorney, Agent, or Firm* — Posz Law Group, PLC

(57) ABSTRACT

A sensor device has a gyro sensor and an acceleration sensor. The gyro sensor has a fixed base portion formed in a rectangular frame shape. The acceleration sensor is formed in an inside space of the fixed base portion of the rectangular frame shape. The gyro sensor is formed in an outside space formed between the fixed base portion and an outer frame portion of a sensor base plate. The gyro sensor and acceleration sensor are formed in one chip. As a result, the sensor device can be made smaller in size.

10 Claims, 9 Drawing Sheets

SENSOR DEVICE

CROSS REFERENCE TO RELATED APPLICATION

This application is based on Japanese Patent Application No. 2015-140824 filed on Jul. 14, 2015, the disclosure of which is incorporated herein by reference.

FIELD OF TECHNOLOGY

The present disclosure relates to a sensor device having a structure of a combo sensor, in which a gyro sensor and a dynamic quantity sensor of any other type are integrally formed.

BACKGROUND

A sensor device is known in the art, according to which the sensor device has a combo sensor structure so that a gyro sensor (that is, an angular velocity sensor) and an acceleration sensor are formed in one package.

For example, according to a prior art disclosed in Japanese Patent No. 3,435,665, a combo sensor having two different kinds of dynamic quantity sensors is formed by use of a wafer level package (hereinafter, WLP). According to the prior art of this kind, the sensor has a structure in which a gyro sensor and an acceleration sensor are formed in a common sensor base plate, namely, the two sensors are formed in one chip. In the above prior art, the sensor base plate is sealed by a supporting plate and a cap layer.

More exactly, a capacitive type gyro sensor having a comb-teeth structure and a capacitive type acceleration sensor having a comb-teeth structure are arranged at positions neighboring to each other, in order to form those sensors in one chip. It is possible to reduce a size of the sensor device to some extent, when the combo sensor is formed by one chip.

However, in the sensor device of the above prior art as disclosed in Japanese Patent No. 3,436,665, there is no other ways than to reduce each of the sensors itself in size when it is necessary to further reduce the sensor device in its size as a whole, because the gyro sensor and the acceleration sensor are independently formed and arranged at the positions neighboring to each other. In addition, it is necessary to form a space between the sensors in order to avoid a situation that oscillation may be leaked from the gyro sensor to the acceleration sensor. As above, it is necessary in the above prior art to arrange the gyro sensor and the acceleration sensor at the positions neighboring to each other on a horizontal plane and to provide the space between those two sensors. Therefore, it is difficult to further reduce the size of the sensor device.

The sensor device having the gyro sensor and the acceleration sensor is explained above as the combo sensor. However, the same or similar problem exists in the sensor device having the gyro sensor and the dynamic quantity sensor of any other type than the acceleration sensor, when the gyro sensor and the dynamic quantity sensor are integrally formed.

For example, the same or the similar problem occurs in the sensor device, in which a surface acoustic wave (SAW) element is integrally formed with the gyro sensor. More exactly, it is necessary to form a space between the sensors in order to avoid a situation that oscillation may be leaked from the surface acoustic wave (SAW) element to the acceleration sensor.

SUMMARY OF THE DISCLOSURE

The present disclosure is made in view of the above problem. It is an object of the present disclosure to provide a sensor device having a combo sensor, a structure of which can be easily made smaller in its size.

According to one of features of the present disclosure, a sensor device has a supporting plate and a sensor base plate. The sensor base plate comprises;
 an oscillation type angular velocity sensor; and
 an outer frame portion surrounding the oscillation type angular velocity sensor and fixed to the supporting plate.

The oscillation type angular velocity sensor comprises;
 a fixed base portion fixed to the supporting plate;
 a movable portion having a driving weight and a detecting weight; and
 a beam portion having a driving beam and a detecting beam, the driving beam connecting the driving weight to the fixed base portion and supporting the driving weight in such a way that the driving weight is movable on a plane parallel to a surface of the supporting plate, and the detecting beam connecting the detecting weight to the fixed base portion and supporting the detecting weight in such a way that the detecting weight is movable on the plane parallel to the surface of the supporting plate.

In the above sensor device, the fixed base portion is formed in a frame shape so as to form an inner frame portion and a dynamic quantity sensor is formed in the sensor base plate at a position inside of the inner frame portion.

As above, the dynamic quantity sensor (the acceleration sensor) is formed in the inside of the fixed base portion of the oscillation type angular velocity sensor (the gyro sensor), which has a frame shape. According to the above structure, the gyro sensor and the acceleration sensor are formed in one chip and thereby the sensor device can be made further smaller in size.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
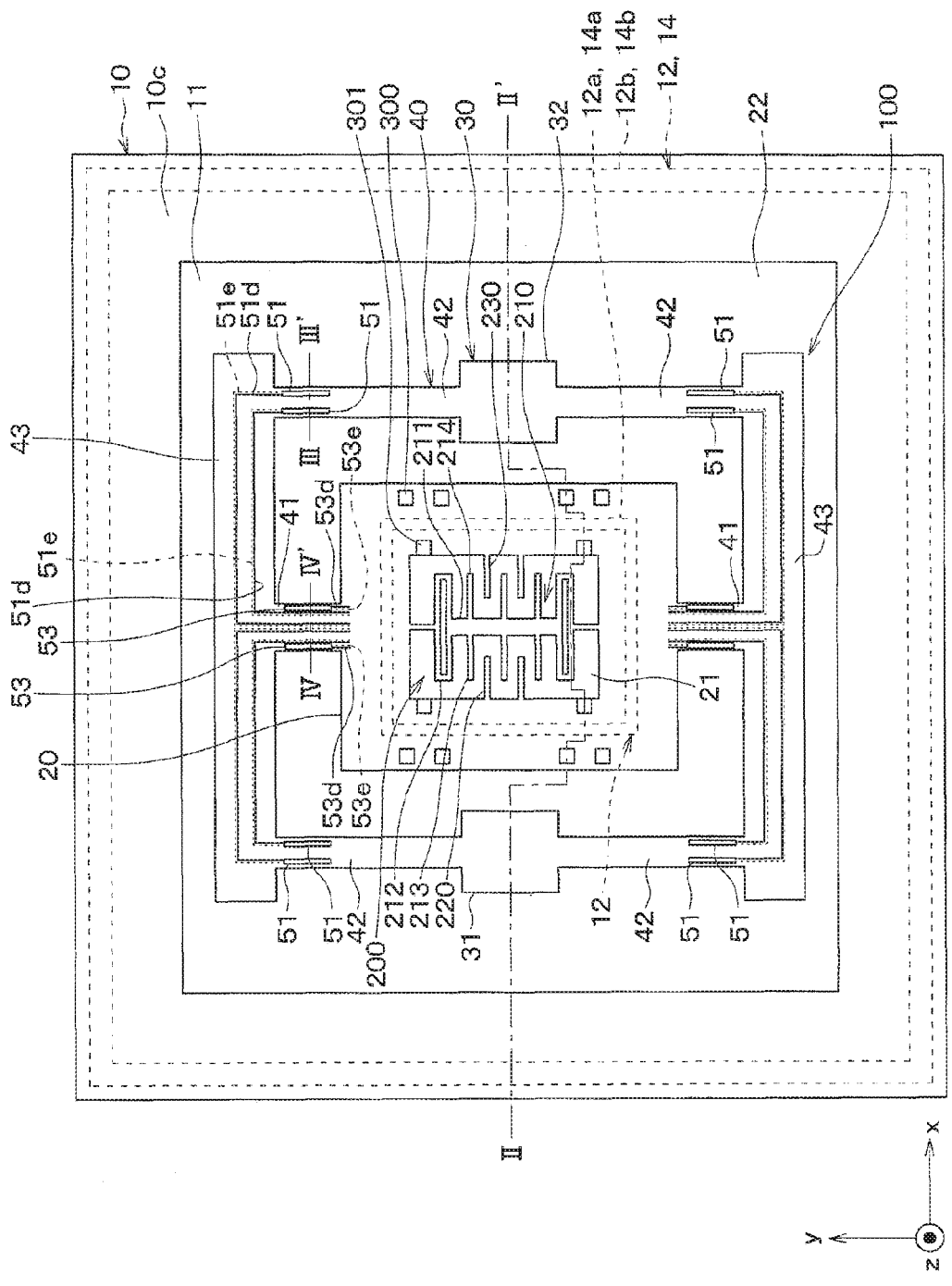
FIG. 1 is a layout chart showing an upper-side surface of a sensor base plate of a sensor device according to an embodiment of the present disclosure.

The present disclosure will be explained hereinafter by way of multiple embodiments and/or modifications with reference to the drawings. The same reference numerals are given to the same or similar parts or portions throughout the multiple embodiments and modifications in order to eliminate repeated explanation.

Embodiment

An embodiment of the present disclosure will be explained. A sensor device of the present embodiment has a WLP (Wafer Level Package) structure, in which a gyro sensor of an oscillation type and an acceleration sensor of a capacitive type having a comb-teeth structure are formed in one chip. For example, the sensor device is mounted in a vehicle in order that the gyro sensor of the sensor device detects a rotational angular velocity around a center axis of the vehicle which is in parallel to a vertical direction of the vehicle and the acceleration sensor of the sensor device detects an acceleration, for example, in a front-back direction or a right-left direction of the vehicle. The sensor device of the present disclosure may be applied to any other use than the vehicle.

The sensor device of the present embodiment will be further explained with reference to FIGS. 1 to 7.

Figure 2:
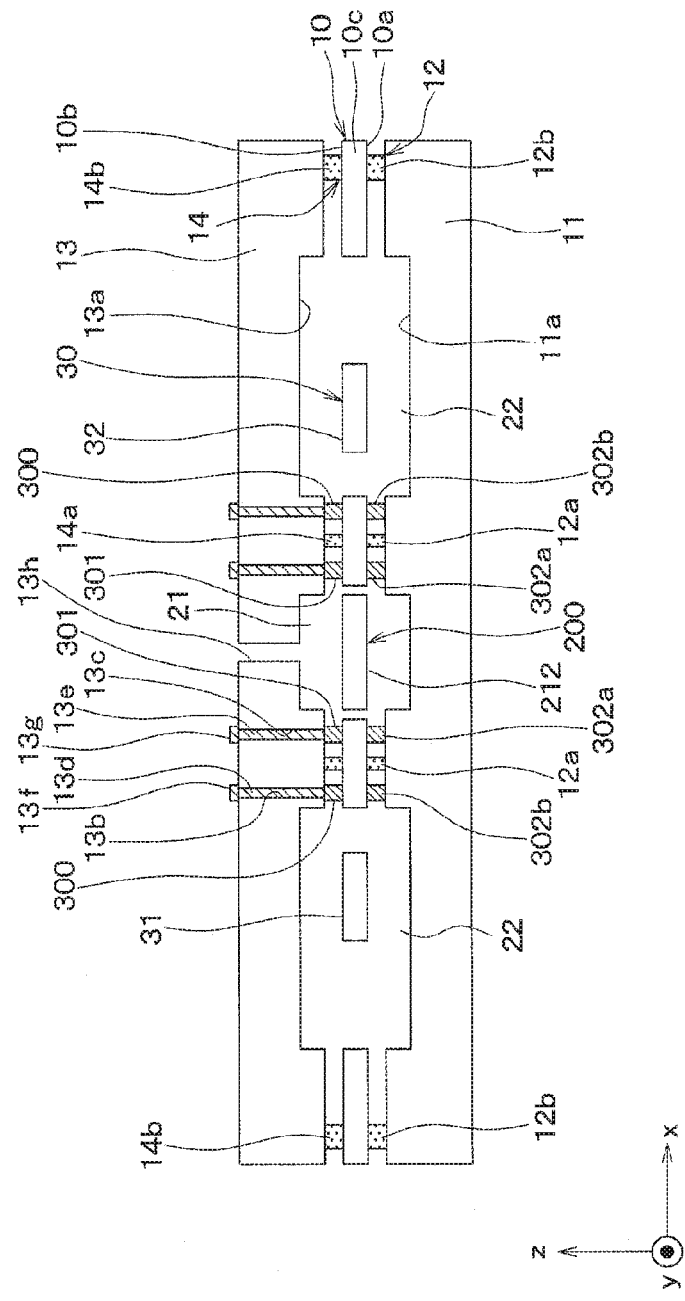
FIG. 2 is a schematic cross sectional view taken along a line II-II' in FIG. 1.

As shown in FIGS. 1 and 2, a gyro sensor 100 and an acceleration sensor 200 are formed in a sensor base plate 10 of the sensor device. Hereinafter, a right-left direction in FIG. 1 is referred to as an x-direction, an up-down direction in FIG. 1 is referred to as a y-direction, and a direction perpendicular to an x-y plane is referred to as a z-direction.

The sensor device is mounted in the vehicle in such a manner that the x-y plane of FIG. 1 coincides with a horizontal direction of the vehicle and the z-direction in FIG. 2 coincides with the vertical direction of the vehicle.

As shown in FIGS. 1 and 2, the gyro sensor 100 as well as the acceleration sensor 200 is formed by an etching process applied to the sensor base plate 10, so that each of the gyro sensor 100 and the acceleration sensor 200 has a predetermined layout. A supporting plate 11, which is located on a side of a rear-side plate surface 10a of the sensor base plate 10, is connected to the sensor base plate 10 via a plate connecting portion 12 (12a, 12b). A cap layer 13, which is located on a side of a front-side plate surface 10b of the sensor base plate 10, that is, on a side opposite to the supporting plate 11, is connected to the sensor base plate 10 via a plate connecting portion 14 (14a, 14b). As above, the sensor device has the WLP structure, according to which each of the supporting plate 11 and the cap layer 13 is respectively connected to each of the plate surfaces 10a and 10b of the sensor base plate 10.

In the present embodiment, each of the sensor base plate 10, the supporting plate 11 and the cap layer 13 is made of a silicon substrate, while each of the plate connecting portions 12 and 14 is made of an insulating film, for example, a silicon dioxide film. Each of the sensor base plate 10, the supporting plate 11 and the cap layer 13 is made of an individual silicon substrate. However, the sensor base plate 10 and the supporting plate 11 may be alternatively made of an SOI (Silicon on insulator) substrate, wherein the plate connecting portion 12 is interposed between the sensor base plate 10 and the supporting plate 11.

In the gyro sensor 100, a predetermined patterning is made for each of a fixed base portion 20, a movable portion 30 and a beam portion 40. As shown in FIG. 2, the fixed base portion 20 is fixed to the supporting plate 11 via the plate connecting portion 12, more exactly, via a lower-inside plate connecting portion 12a. The movable portion 30 and the beam portion 40 form an oscillator of the gyro sensor 100. The movable portion 30 is arranged above the supporting plate 11 in a released condition in the z-direction. The beam portion 40 not only supports the movable portion 30 but also displaces the movable portion 30 in the x-direction and/or the y-direction in order to detect an angular velocity. A more detailed structure of the fixed base portion 20, the movable portion 30 and the beam portion 40 will be explained hereinafter. The fixed base portion 20 is also referred to as an inner frame portion 20.

The fixed base portion 20 supports the movable portion 30. Various kinds of pad connecting portions 300 and 301 are formed on the fixed base portion 20, wherein the pad connecting portions include a pad connecting portion(s) for receiving driving electric power, a pad connecting portion(s) for taking out a detection signal being used for detecting the angular velocity, or the like.

In the present embodiment, the above functions (the supporting function, the power receiving function, and the signal taking-out function) are realized by one fixed base portion 20. However, the fixed base portion 20 may be composed of separate portions, which include a supporting portion for supporting the movable portion 30, a power receiving portion to which the driving electric power is applied, and a signal outputting portion to be used for detecting the angular velocity. In such a case, the fixed base portion 20 of FIG. 1 is used as the supporting portion, while the power receiving portion and the signal outputting portion are additionally formed in the sensor base plate and connected to the supporting portion. Then, the pad connecting portions for receiving the driving electric power are formed on the power receiving portion, and the pad connecting portions for taking out the detection signal are formed on the signal outputting portion.

The structure of the present embodiment will be further explained. An upper-side surface of the fixed base portion 20 (the inner frame portion 20) is formed in a rectangular frame shape, so that an inside space 21 is formed inside of the frame-shaped fixed base portion 20 and an outside space 22 is formed outside of the frame-shaped fixed base portion 20. The acceleration sensor 200 is arranged in the inside space 21. A width of the fixed base portion 20 is arbitrarily decided. In the present embodiment, the width of the fixed base portion 20 is made to be larger than that of a detecting beam 41 (explained below).

The lower-inside plate connecting portion 12a is arranged between the fixed base portion 20 and the supporting plate 11 in the z-direction, so that the fixed base portion 20 is fixed to the supporting plate 11 via the lower-inside plate connecting portion 12a. In a similar manner, an upper-inside connecting portion 14a is arranged between the fixed base portion 20 and the cap layer 13 in the z-direction, so that the fixed base portion 20 is also fixed to the cap layer 13 via the upper-inside plate connecting portion 14a. Each of the lower-inside and the upper-inside plate connecting portions 12a and 14a is formed in a rectangular frame shape, as indicated by dotted lines in FIG. 1, so as to surround the inside space 21 of the fixed base portion 20. The inside space 21 and the outside space 22 are defined, or separated from each other, by the lower-inside and the upper-inside plate connecting portions 12a and 14a in each of spaces between the sensor base plate 10 and the supporting plate 11 and between the sensor base plate 10 and the cap layer 13. As above, the outside space 22 is defined at the outside of the fixed base portion 20 so that components of the gyro sensor 100 (including the movable portion 30, the beam portion 40 and so on) are located in the outside space 22. In a similar manner, the inside space 21 is defined at the inside of the fixed base portion 20 so that components (explained below) of the acceleration sensor 200 are located in the inside space 21.

The movable portion 30, which is one of the components of the gyro sensor 100, is displaced depending on the angular velocity applied thereto. More exactly, the movable portion 30 is composed of a driving weight, which is oscillated when driving voltage is applied to the gyro sensor 100, and a detecting weight, which is oscillated depending on the angular velocity applied to the detecting weight during driving oscillation of the driving weight. The driving weight and the detecting weight may be separately formed or integrally formed. More exactly, in the present embodiment, the movable portion 30 is composed of driving-and-detecting weights 31 and 32, each of which has two functions as the driving weight and the detecting weight.

The driving-and-detecting weights 31 and 32 are located at both sides of the fixed base portion 20 in the x-direction, wherein each of the driving-and-detecting weights 31 and 32 is separated from the fixed base portion 20 by the same distance to each other. Each of the driving-and-detecting weights 31 and 32 is made with the same dimension and the same mass to each other.

In the present embodiment, an upper-side planar shape of each driving-and-detecting weight 31/32 in the x-y plane is formed in a rectangular shape. Each of driving beams 42 (explained below) of the beam portion 40 is connected to each of side portions of the rectangular weight 31/32, which are opposing to each other in the y-direction, so that each of the driving-and-detecting weights 31 and 32 is supported by the driving beams 42 at both sides of the weight 31/32.

The plate connecting portion 12 is not formed at the lower side of the driving-and-detecting weights 31 and 32, so that each of the driving-and-detecting weights 31 and 32 is released from the supporting plate 11. Therefore, each of the driving-and-detecting weights 31 and 32 is capable of the driving oscillation in the x-direction by deformation of the driving beams 42. In addition, each of the driving-and-detecting weights 31 and 32 is capable of oscillating in a rotational direction around a center of the fixed base portion 20 (including the y-direction) by the deformation of the driving beams 42 when the angular velocity is applied thereto.

The beam portion 40 is composed of the detecting beams 41, the driving beams 42 and supporting beams 43.

Each of the detecting beams 41 is a straightly extending beam in the y-direction for connecting the supporting beam 43 to the fixed base portion 20 (the inner frame portion 20). In the present embodiment, each inside end of the detecting beams 41 is connected to each of side portions (an outer periphery) of the fixed base portion 20, wherein the side portions are opposing to each other in the y-direction. Each outside end of the detecting beam 41 is connected to each middle point of the supporting beam 43. Each of the supporting beams 43 is thereby connected to the fixed base portion 20 by each of the detecting beams 41. A dimension (a width) of the detecting beam 41 in the x-direction is smaller than a dimension (a thickness) of the detecting beam 41 in the z-direction, so that the detecting beam 41 is capable of being deformed in the x-direction.

Each of the driving beams 42 is a straightly extending beam in the y-direction, that is, in a direction parallel to the detecting beam 41, for connecting the driving-and-detecting weight 31/32 to the supporting beams 43. More exactly, a longitudinal end of each driving beam 42 is connected each longitudinal end of the supporting beam 43. In each of the driving beams 42, a distance between the driving beam 42 and the detecting beam 41 in the x-direction is the same to a distance between the other driving beam 42 and the other detecting beam 41 in the x-direction. A dimension (a width) of the driving beam 42 in the x-direction is smaller than a dimension (a thickness) of the driving beam 42 in the z-direction, so that the driving beam 42 is capable of being deformed in the x-direction. Therefore, each of the driving-and-detecting weights 31 and 32 is capable of being displaced in the x-y plane. Each of the driving-and-detecting weights 31 and 32 is formed at a middle point of the driving beam 42.

Each of the supporting beams 43 is a straightly extending beam in the x-direction, a center (the middle point) of which is connected to the detecting beam 41 and each longitudinal end of which is connected to each of the driving beams 42. A dimension (a width) of the supporting beam 43 in the y-direction is made to be larger than the dimension (the width) of the detecting beam 41 and the driving beam 42 in the x-direction. As a result, the driving beams 42 are mainly deformed during the driving oscillation, while the detecting beams 41 and the driving beams 42 are mainly deformed when the angular velocity is applied to the sensor device.

In the above structure, the upper-side shape of the rectangular frame is formed by the driving beams 42, the supporting beams 43 and the driving-and-detecting weights 31 and 32. The detecting beams 41 and the fixed base portion 20 are located at an inside of the rectangular frame formed in the outside space 22. A basic structure of the gyro sensor 100 is formed as above.

Figure 3:
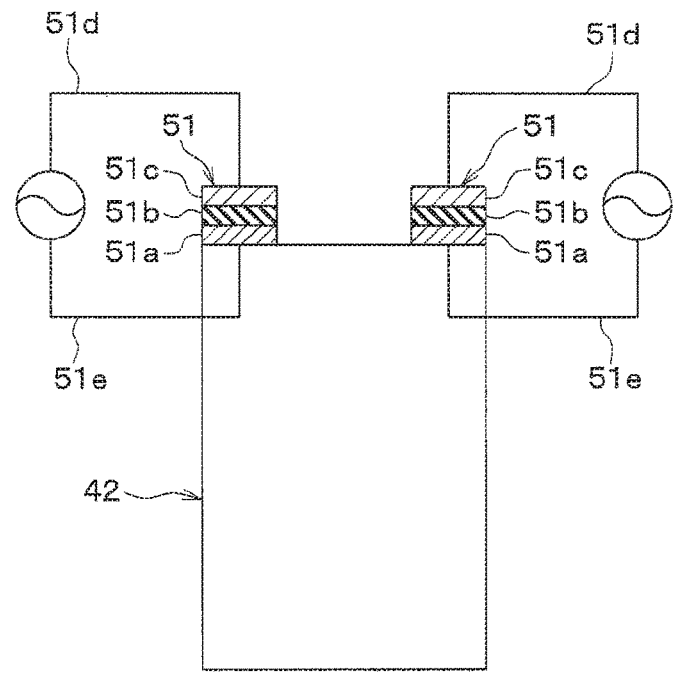
FIG. 3 is a schematic cross sectional view taken along a line III-III' in FIG. 1.
Figure 4:
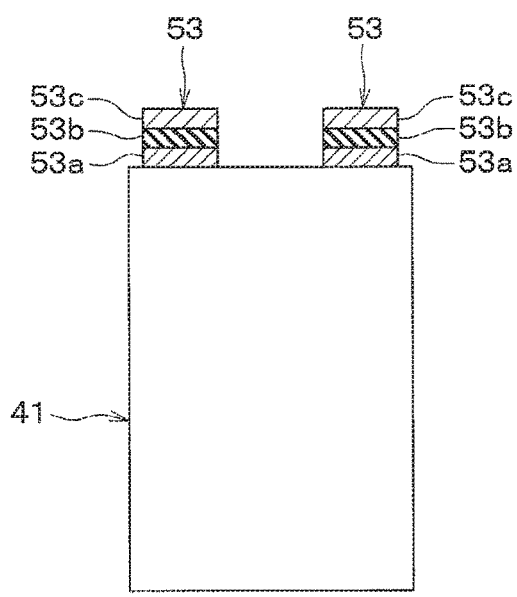
FIG. 4 is a schematic cross sectional view taken along a line IV-IV' in FIG. 1.

As shown in FIGS. 1 and 3, a pair of driving portions 51 is formed on each longitudinal end of the driving beams 42. As shown in FIG. 4, a pair of oscillation detecting portions 53 is formed on each of the detecting beams 41. The driving portions 51 and the oscillation detecting portions 53 are electrically connected to an electronic control device (not shown) provided at an outside of the sensor device, so that the sensor device is operated.

As shown in FIG. 1, each pair of the driving portions 51 is formed on the longitudinal end of each driving beam 42 neighboring to a connecting area between the driving beam 42 and the supporting beam 43. In each pair of the driving portions 51, the driving portions 51 are arranged at a predetermined distance from each other in the x-direction and straightly extend in the y-direction.

As shown in FIG. 3, each of the driving portions 51 is composed of a lower-layer electrode 51a, a driving thin film 51b and an upper-layer electrode 51c, which are built up in the z-direction on the upper-side surface of the driving beam 42. Each of the lower-layer electrode 51a and the upper-layer electrode 51c is made of, for example, an aluminum electrode. Each of the lower-layer electrode 51a and the upper-layer electrode 51c is electrically connected to a pad (not shown) for applying the driving electric power or a pad (not shown) for a ground connection through each wiring portion 51d/51e, which extends to the fixed base portion 20 via the supporting beam 43 and the detecting beam 41, as shown in FIG. 1 (indicated by solid lines and dotted lines). The driving thin film 51*b* is composed of, for example, lead zirconium titanate (LZT).

According to the above structure, the driving thin film 51*b* is deformed by a difference of voltage generated between the lower-layer electrode 51*a* and the upper-layer electrode 51*c*, in order to produce a forced oscillation in the driving beam 42 and thereby produce a forced oscillation (the driving oscillation) in the driving-and-detecting weight 31/32 in the x-direction. More exactly, the driving thin film 51*b* is deformed to generate a compression stress in one of the driving portions 51 of each pair (for example, a right-hand driving portion 51 in FIG. 3), while the driving thin film 51*b* is deformed to generate a stretching stress in the other driving portion 51 of the pair (for example, a left-hand driving portion 51 in FIG. 3). When the electric power is supplied to the driving portions 51 so as to alternately repeat the above generation of the compression stress and the stretching stress in the driving beam 42, each of the driving-and-detecting weights 31 and 32 is oscillated in the x-direction.

As shown in FIGS. 1 and 4, each pair of the oscillation detecting portions 53 is formed on a portion of each detecting beam 41 (the inside end) neighboring to a connecting area between the detecting beam 41 and the fixed base portion 20. In each pair of the oscillation detecting portions 53, the oscillation detecting portions 53 are arranged at both sides of the detecting beam 41 and separated from each other by a predetermined distance in the x-direction. Each of the oscillation detecting portions 53 straightly extends in the y-direction.

As shown in FIG. 4, each of the oscillation detecting portions 53 is composed of a lower-layer electrode 53*a*, a detecting thin film 53*b* and an upper-layer electrode 53*c*, which are built up in the z-direction on the upper-side surface of the detecting beam 41. A structure as well as material of the oscillation detecting portion 53 is the same to that of the driving portion 51. Each of the lower-layer electrode 53*a* and the upper-layer electrode 53*c* is electrically connected to a pad (not shown) for outputting detection signals through each wiring portion 53*d*/53*e*, which extends to the fixed base portion 20, as indicated by solid lines and dotted lines in FIG. 1.

According to the above structure, when the detecting beam 41 is deformed by the angular velocity applied to the sensor device, the detecting thin film 53*b* is correspondingly deformed. Since an electric signal (for example, an electric current in a case of the oscillation with a constant voltage, or an electric voltage in a case of the oscillation with a constant current) is changed between the lower-layer electrode 53*a* and the upper-layer electrode 53*c*, such change of the electric signal is outputted as the detection signal indicating the angular velocity via the pad (not shown) for outputting the detection signal.

The gyro sensor 100 of the present embodiment is formed in the sensor device as above. In FIG. 1, electrical connections for the wiring portions 51*d* and 51*e* of the driving portions 51 as well as electrical connections for the wiring portions 53*d* and 53*e* of the oscillation detecting portions 53 are not indicated in detail. However, each of those wiring portions is electrically connected to the respective pad connecting portion 300.

The acceleration sensor 200 of the sensor device will be explained hereinafter.

The acceleration sensor 200 is formed in the inside space 21 of the fixed base portion 20 (the inner frame portion 20).

As shown in FIG. 1, the acceleration sensor 200 has a structure having a movable portion 210, first fixed electrodes 220 and second fixed electrodes 230, wherein the structure outputs the sensor signal depending on the acceleration applied to the sensor device.

The movable portion 210 is arranged in the inside space 21 of the fixed base portion 20 so as to cut across the inside space 21. The movable portion 210 is formed as a beam structure floating above the supporting plate 11. More exactly, the movable portion 210 is composed of a weight portion 211, flexible portions 212, first movable electrodes 213 and second movable electrodes 214.

The weight portion 211 is formed in a rectangular shape extending in the y-direction. Each longitudinal end of the weight portion 211 is connected to each of the flexible portions 212. Each of the first and the second movable electrodes 213 and 214 is connected to each side of the weight portion 211 in the x-direction.

Each of the flexible portions 212 is formed in a rectangular frame shape, wherein two parallel and straightly extending portions are connected to each other at its longitudinal ends. The longitudinal end of the weight portion 211 is connected to a middle point of one of the straightly extending portions of the flexible portion 212, while a middle of the other straightly extending portion of the same flexible portion 212 is connected to an inner peripheral wall of the fixed base portion 20 by a supporting beam. Each of the supporting beams is formed between the fixed base portion 20 and the movable portion 210 to support the movable portion 210. Since the fixed base portion 20 is supported by the supporting plate 11 via the plate connecting portion 12 (the lower-inside plate connecting portion 12*a*), each of the supporting beams between the fixed base portion 20 and each of the flexible portions 212 is supported by the supporting plate 11 via the fixed base portion 20 and the plate connecting portion 12. Since the flexible portion 212 is formed by the two parallel and straightly extending portions, the flexible portion 212 is easily deformed in the y-direction. The weight portion 211 as well as the first and the second movable electrodes 213 and 214 is capable of being displaced in the longitudinal direction of the weight portion 211 (the y-direction) by the deformation of each flexible portion 212.

Each of the first and the second movable electrodes 213 and 214 extends from each longitudinal side of the weight portion 211 in a direction perpendicular to the longitudinal direction of the weight portion 211 (in the x-direction). Each of the first and the second movable electrodes 213 and 214 is composed of multiple electrodes (three electrodes in the present embodiment). Each of the first movable electrodes 213 is opposed to each of the first fixed electrodes 220 in the y-direction, in such a way that each of the first movable electrodes 213 and each of the first fixed electrodes 220 are separated from each other in the y-direction by a predetermined distance. In the same manner, each of the second movable electrodes 214 is opposed to each of the second fixed electrodes 230 in the y-direction, in such a way that each of the second movable electrodes 214 and each of the second fixed electrodes 230 are separated from each other in the y-direction by a predetermined distance. When the first movable electrodes 213 as well as the second movable electrodes 214 are displaced together with the weight portion 211 by the deformation of the flexible portions 212, the distances between the first movable electrodes 213 and the first fixed electrodes 220 as well as the distances between the second movable electrodes 214 and the second fixed electrodes 230 are changed.

Each of the first and the second fixed electrodes 220 and 230 extends from the inner peripheral walls of the fixed base portion 20 (each of the inner peripheral walls is opposed to the longitudinal sides of the weight portion 211) in a direction perpendicular to the longitudinal direction of the weight portion 211 (in the x-direction). As above, the first and the second fixed electrodes 220 and 230 are arranged in such a way that the movable portion 210 is interposed between the first and the second fixed electrodes 220 and 230 in the x-direction.

As shown in FIG. 1, the first fixed electrodes 220 are located on a left-hand side of the movable portion 210, while the second fixed electrodes 230 are located on a right-hand side of the movable portion 210. The first and the second fixed electrodes 220 and 230 are electrically independent from each other. Since the fixed base portion 20 is supported by the supporting plate 11 via the plate connecting portion 12 (the lower-inside plate connecting portion 12a), the first and the second fixed electrodes 220 and 230 are supported by the supporting plate 11 via the fixed base portion 20 and the plate connecting portion 12.

The acceleration sensor 200 of the present embodiment is formed in the sensor device as above. In FIG. 1, electrical wiring portions for the movable portion 210 as well as electrical wiring portions for the first and the second fixed electrodes 220 and 230 are not indicated. However, each of those wiring portions is electrically connected to the respective pad connecting portions 301.

A surrounding frame portion 10c (an outer frame portion 10c) is further formed in the sensor base plate 10 so as to surround the gyro sensor 100 and the acceleration sensor 200. The surrounding frame portion 10c is formed in a rectangular frame shape for surrounding the gyro sensor 100 and the acceleration sensor 200. The surrounding frame portion 10c is connected to the supporting plate 11 via a lower-outside plate connecting portion 12b and connected to the cap layer 13 via an upper-outside plate connecting portion 14b.

The supporting plate 11 is made of the silicon substrate, as already explained above. The upper side thereof is connected to the sensor base plate 10 via the plate connecting portion 12 (12a and 12b). More exactly, the upper side of the supporting plate 11 is connected to the fixed base portion 20 (the inner frame portion 20) of the sensor base plate 10 via the lower-inside plate connecting portion 12a. In addition, an outer peripheral portion of the supporting plate 11 is connected to the surrounding frame portion 10c (the outer frame portion 10c) via the lower-outside plate connecting portion 12b. The supporting plate 11 may be formed by a simple flat plate. However, in the present embodiment, cavities 11a are formed on an upper-side surface of the supporting plate 11 by the etching process at such areas other than those portions at which the supporting plate 11 is respectively connected to the fixed base portion 20 and the surrounding frame portion 10c via the lower-inside and the lower-outside plate connecting portions 12a and 12b. According to the above structure (the cavities 11a), each part and/or each component of the gyro sensor 100 and the acceleration sensor 200 is prevented from being brought into contact with the upper-side surface of the supporting plate 11.

Dummy pad connecting portions 302a and 302b are formed between the supporting plate 11 and the fixed base portion 20. The dummy pad connecting portions 302a and 302b are formed on the lower-side plate surface 10a of the sensor base plate 10 at such locations opposing in the z-direction to the respective pad connecting portions 300 and 301 formed on the upper-side plate surface 10b. The dummy pad connecting portions 302a and 302b are formed in the same patterns and made of the same material (for example, aluminum) to the pad connecting portions 300 and 301.

It may be possible to electrically connect the fixed base portion 20 to the supporting plate 11 by the dummy pad connecting portions 302a and 302b. However, in the present embodiment, the dummy pad connecting portions 302a and 302b are formed not for the purpose of the electrical connection but for the purpose of stress relaxation.

The sensor device has the pad connecting portions 300 and 301 for the electrical connection of the respective parts and/or components of the gyro sensor 100 and the acceleration sensor 200. However, if the sensor device has the pad connecting portions 300 and 301 only on the upper-side plate surface 10b of the sensor base plate 10, a gap may be generated between the stress on the lower-side plate surface 10a and the stress on the upper-side plate surface 10b of the sensor base plate 10. Therefore, in the present embodiment, the dummy pad connecting portions 302a and 302b are formed at such locations opposing to the pad connecting portions 300 and 301 and in the same patterns to the pad connecting portions 300 and 301, in order to equalize the stresses on the upper-side plate surface 10b and the lower-side plate surface 10a of the sensor base plate 10.

The cap layer 13 is also made of the silicon substrate, as already explained above. A lower side thereof is connected to the sensor base plate 10 via the plate connecting portion 14 (14a and 14b). More exactly, the lower side of the cap layer 13 is connected to the fixed base portion 20 (the inner frame portion 20) of the sensor base plate 10 via the upper-inside plate connecting portion 14a. In addition, an outer peripheral portion of the cap layer 13 is connected to the surrounding frame portion 10c (the outer frame portion 10c) via the upper-outside plate connecting portion 14b. The cap layer 13 may be formed by a simple flat substrate. However, in the present embodiment, cavities 13a are likewise formed on a lower-side surface of the cap layer 13 by the etching process at such areas other than those portions at which the cap layer 13 is connected to the fixed base portion 20 and the surrounding frame portion 10c via the upper-inside and the upper-outside plate connecting portions 14a and 14b. According to the above structure (the cavities 13a), each part and/or each component of the gyro sensor 100 and the acceleration sensor 200 is prevented from being brought into contact with the lower-side surface of the cap layer 13.

The pad connecting portions 300 and 301 are formed between the cap layer 13 and the fixed base portion 20. Through-holes 13b and 13c are formed in the cap layer 13 at such locations opposing to the pad connecting portions 300 and 301. A via 13d or 13e (hereinafter, the TSV 13d or 13e) is formed in each of the through-holes 13b and 13c. Multiple pad portions 13f and 13g are formed on an upper-side surface of the cap layer 13. According to the above structure, each of the pad portions 13f and 13g is electrically connected to the corresponding pad connecting portion 300, 301 through the respective TCV 13d, 13e. Although not shown in FIGS. 1 and 2, outside wires are connected to each of the pad portions 13f and 13g by a wire bonding process, so that the sensor device is electrically connected to an outside device (not shown).

An air breathing hole 13h is further formed in the cap layer 13 at a location opposing to the acceleration sensor 200. The air can be introduced into the inside space 21, in which the acceleration sensor 200 is formed, through the air breathing hole 13h, so that pressure of the inside space 21 is maintained at the atmospheric pressure. The inside space 21 may be formed as a vacuum chamber. However, it is preferable that the movable portion 210 of the acceleration sensor 200 is mainly displaced depending on the oscillation of a low frequency by use of a damping effect and little displaced depending on the oscillation of a high frequency, when the sensor device is designed to detect the acceleration of the low frequency. Therefore, in the present embodiment, the inside space 21 is communicated to the air to thereby increase the damping effect of the flexible portions 212.

Figure 5A:
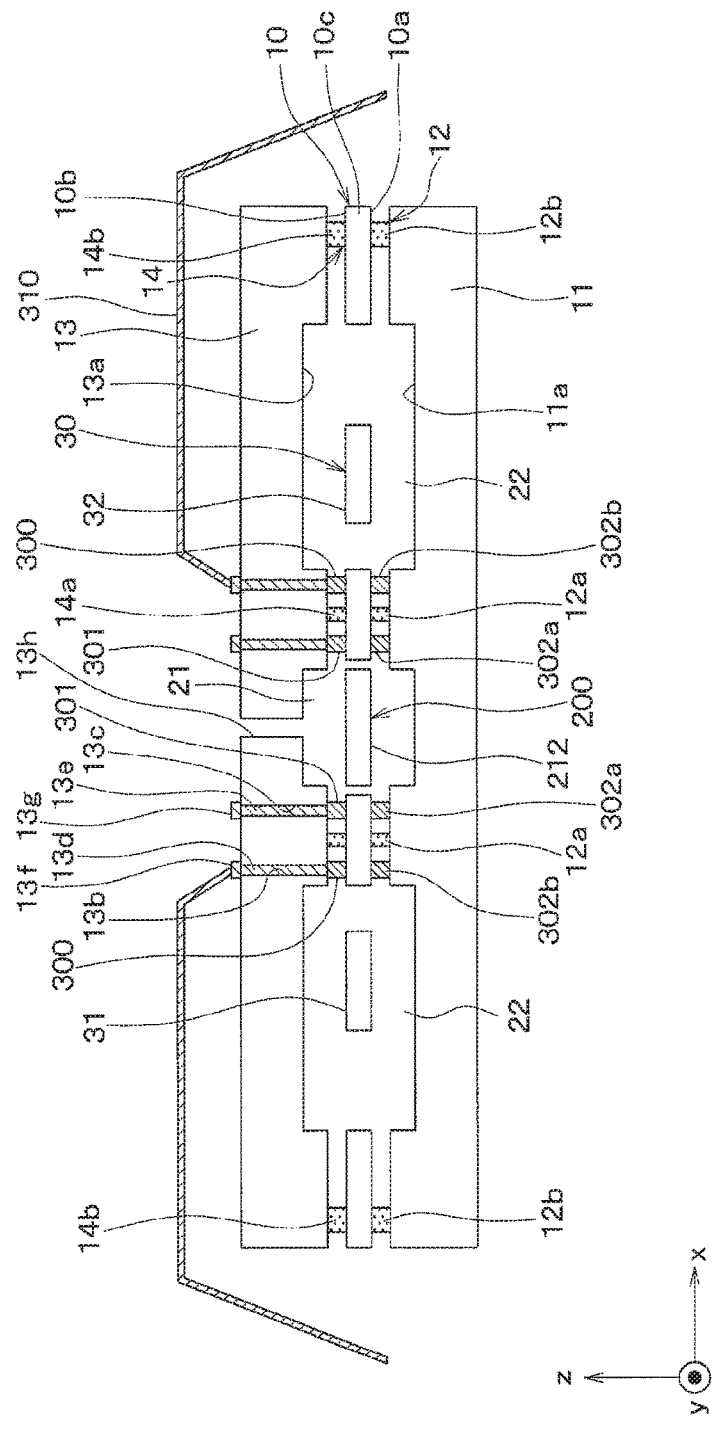
FIG. 5A is a schematic cross sectional view showing an example of the sensor device, in which the sensor base plate is mounted to a printed circuit board (not shown)

According to the sensor device of the present embodiment having the above structure, each of the pad portions 13*f* and 13*g* is electrically connected to outside electric circuits (for example, wiring patterns formed in a printed circuit board) via bonding wires 310, as shown in FIG. 5A.

Figure 5B:
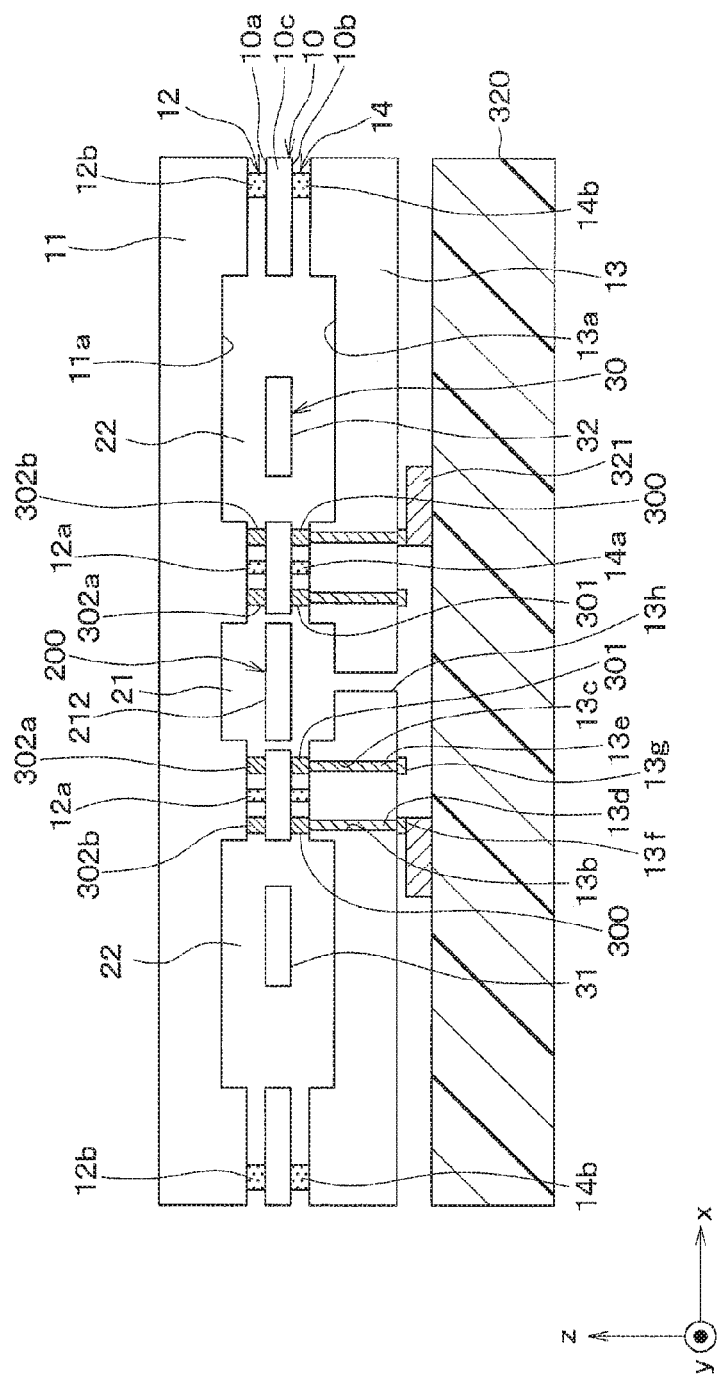
FIG. 5B is a schematic cross sectional view showing another example of the sensor device, in which the sensor base plate is mounted to a printed circuit board.

Alternatively, as shown in FIG. 5B, the sensor device may be electrically connected to a circuit board 320 of the printed circuit board via solder balls 321 formed on the circuit board 320.

Figure 5C:
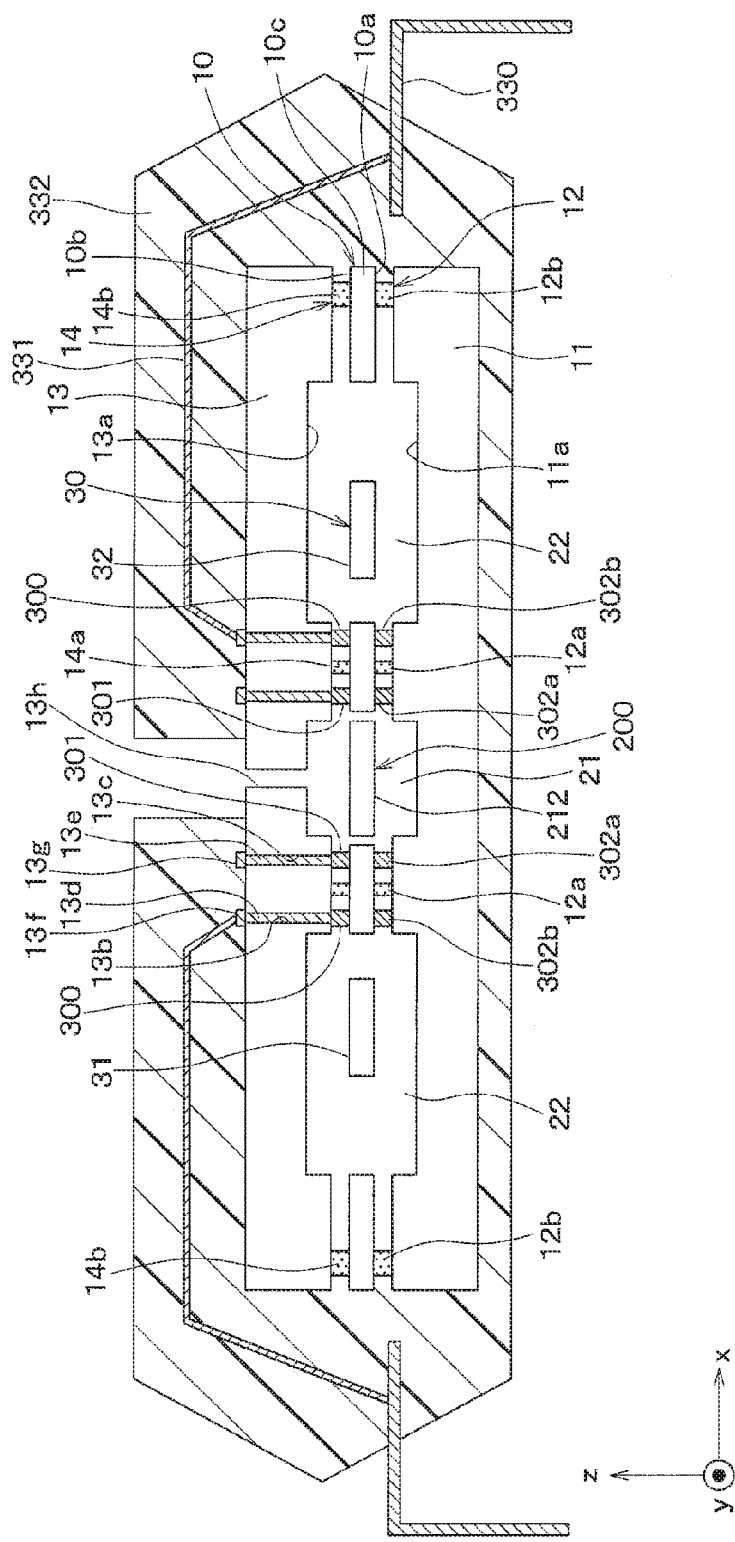
FIG. 5C is a schematic cross sectional view showing a further example of the sensor device, in which the sensor base plate is mounted to a printed circuit board (not shown)

In addition, as shown in FIG. 5C, lead wires 330 are connected to the respective pad portions 13*f* and 13*g* by bonding wires 331, and then the pad portions 13*f* and 13*g*, the bonding wires 331 and a part of each lead wire 330 may be sealed by resin. The lead wires 330 are electrically connected to wiring patterns formed in the printed circuit board (not shown).

An operation of the sensor device having the above structure will be explained with reference to FIGS. 6 and 7.

At first, as shown in FIG. 3, the driving electric power (driving voltage) is applied to the driving portions 51 formed on the driving beams 42. More exactly, the voltage difference is generated between the lower-layer electrode 51*a* and the upper-layer electrode 51*c* in order that the driving thin film 51*b* interposed between those electrodes 51*a* and 51*c* is deformed. In each pair of the driving portions 51, in which the driving portions 51 are arranged in parallel to each other, one of the driving portions 51 (for example, the left-hand driving portion 51 in FIG. 3) is deformed by the compression stress, while the other driving portion 51 (for example, the right-hand driving portion 51 in FIG. 3) is deformed by the stretching stress. The electric power supply to the driving portions 51 is alternately carried out to the left-hand and the right-hand driving portions 51, so that each of the driving-and-detecting weights 31 and 32 is oscillated in the x-direction.

Figure 6:
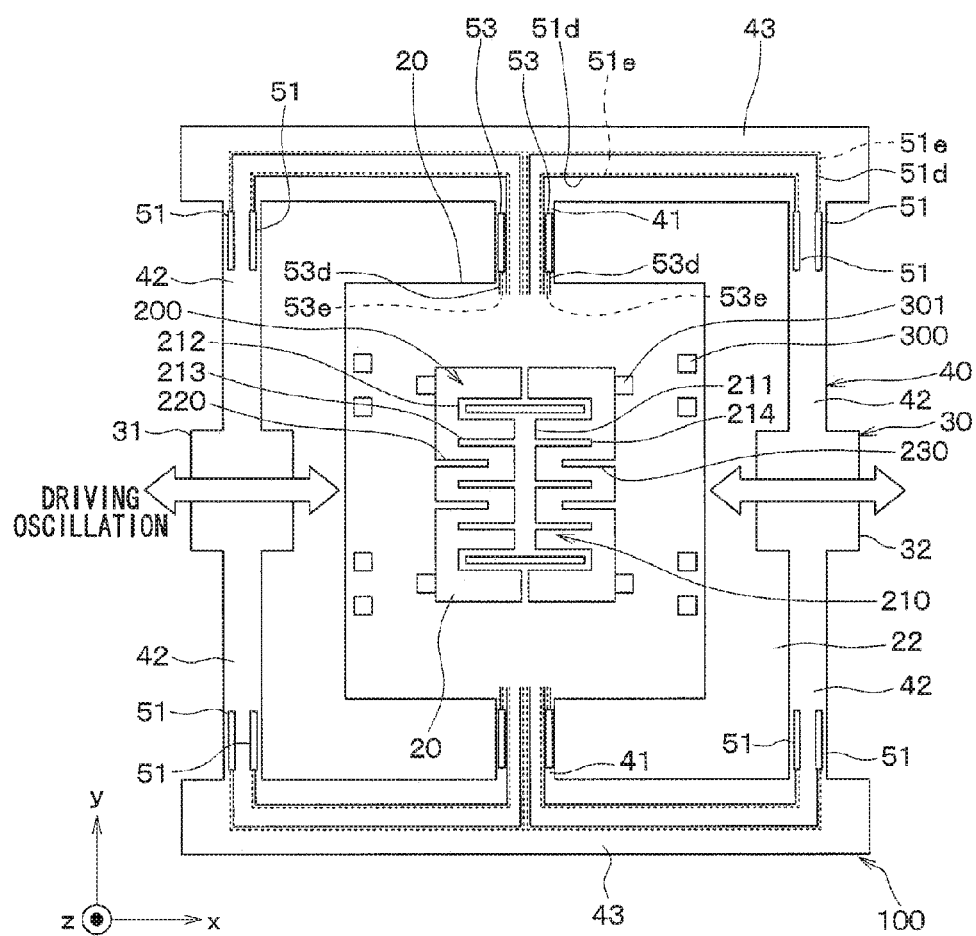
FIG. 6 is a schematic view showing the upper-side surface of the sensor base plate in a condition that a gyro sensor 100 of FIG. 1 is operated.
Figure 7:
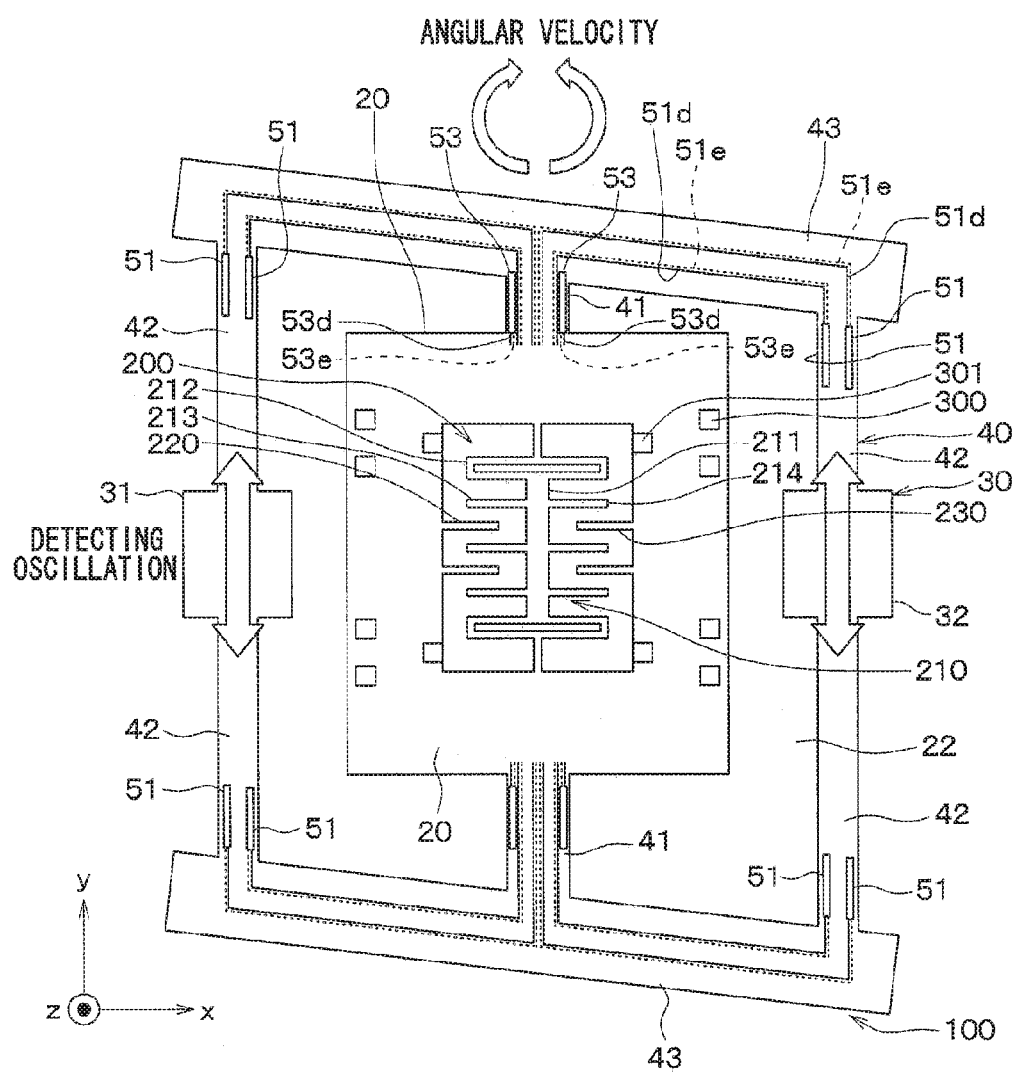
FIG. 7 is a schematic view showing the upper-side surface of the sensor base plate in a condition that an angular velocity acts on the gyro sensor 100 of FIG. 1.

As shown in FIG. 6, the driving-and-detecting weights 31 and 32, each of which is supported by the driving beams 42 at its middle point in the y-direction, are oscillated in the x-direction across the fixed base portion 20 in such a driving mode that one of the driving-and-detecting weights 31 and 32 is moved in a direction opposite to a direction of the other driving-and-detecting weight 31/32. In other words, there are two operational conditions in the driving mode. In a first operational condition, each of the driving-and-detecting weights 31 and 32 is moved in a direction closer to each other. In a second operational condition, each of the driving-and-detecting weights 31 and 32 is moved in a direction away from each other.

A Coriolis force is generated when the angular velocity is applied to an oscillation type angular velocity sensor during the driving oscillation is carried out. Namely, the Coriolis force is generated in the gyro sensor 100 of the present embodiment when the oscillation (the angular velocity) around the z-direction (the center axis of the fixed base portion 20) is applied to the sensor device. As shown in FIG. 7, the sensor device is moved to a detection mode by the Coriolis force, in which each of the driving-and-detecting weights 31 and 32 is oscillated in a rotational direction around the center of the fixed base portion 20, including the y-direction. Therefore, the detecting beams 41 are deformed. The detecting thin film 53*b* of the oscillation detecting portion 53 is deformed depending on the displacement of the detecting beams 41. As a result, the electric signal between the lower-side and the upper-side electrodes 53*a* and 53*b* is changed. The electric signal is inputted to the outside control device (not shown), so that the angular velocity can be detected.

On the other hand, when the acceleration is generated in the y-direction, not only the weight portion 211 but also the first and the second movable electrodes 213 and 214 are moved by the deformation of the flexible portions 212. As a result, the distance between the first fixed electrode 220 and the first movable electrode 213 as well as the distance between the second fixed electrode 230 and the second movable electrode 214 is changed, so that electrostatic capacitance formed between each of the fixed and the movable electrodes is changed. Therefore, it is possible to detect the acceleration in the y-direction, for example, in the front-back direction of the vehicle based on the change of the above electrostatic capacitance.

As explained above, in the sensor device of the present embodiment, the acceleration sensor 200 is formed in the inside space 21 of the fixed base portion 20 (the inner frame portion), which is formed in the frame shape for the gyro sensor 100. Accordingly, two different kinds of the sensors are formed in one chip, wherein the acceleration sensor 200 is formed inside of the gyro sensor. Therefore, it is possible to provide the sensor device having the structure of the combo sensor, which can be more easily made smaller in size.

In particular, since the width of the fixed base portion 20 is made larger than the width of the detecting beam 41, it is possible to reduce an influence to be applied to the acceleration sensor 200, which is formed inside of the fixed base portion 20, wherein the influence is produced by the driving oscillation and/or the detecting oscillation of the gyro sensor 100 during the detecting operation of the angular velocity. As a result, the sensor device can be further made smaller in size.

Further Embodiments and/or Modifications

The present disclosure is not limited to the above embodiment but can be further modified in various manners without departing from a spirit of the present disclosure.

In the above embodiment, the capacitive type acceleration sensor 200 having the comb-teeth structure is explained as the dynamic quantity sensor, which is arranged inside of the fixed base portion 20 of the gyro sensor 100. A dynamic quantity sensor of any other type, for example, an acceleration sensor, a load sensor or the like using a surface acoustic wave (SAW) may be used.

In the above embodiment, the air breathing hole 13*h* is formed in the cap layer 13 in order to apply the damping effect to the acceleration sensor 200, when the capacitive type acceleration sensor 200 having the comb-teeth structure is used. It is not always necessary to form the air breathing hole 13*h*, when a dynamic quantity sensor of any other type is used.

In the above embodiment, the sensor base plate 10, the supporting plate 11 and the cap layer 13 are made of different substrates from each other. However, the sensor base plate 10 and the supporting plate 11 may be formed by the same substrate. For example, the gyro sensor 100 and the acceleration sensor 200 may be formed by the etching process for one semiconductor substrate, and the cap layer 13 separately made is thereafter attached to the semiconductor substrate to cover the sensors.

Figure 8:
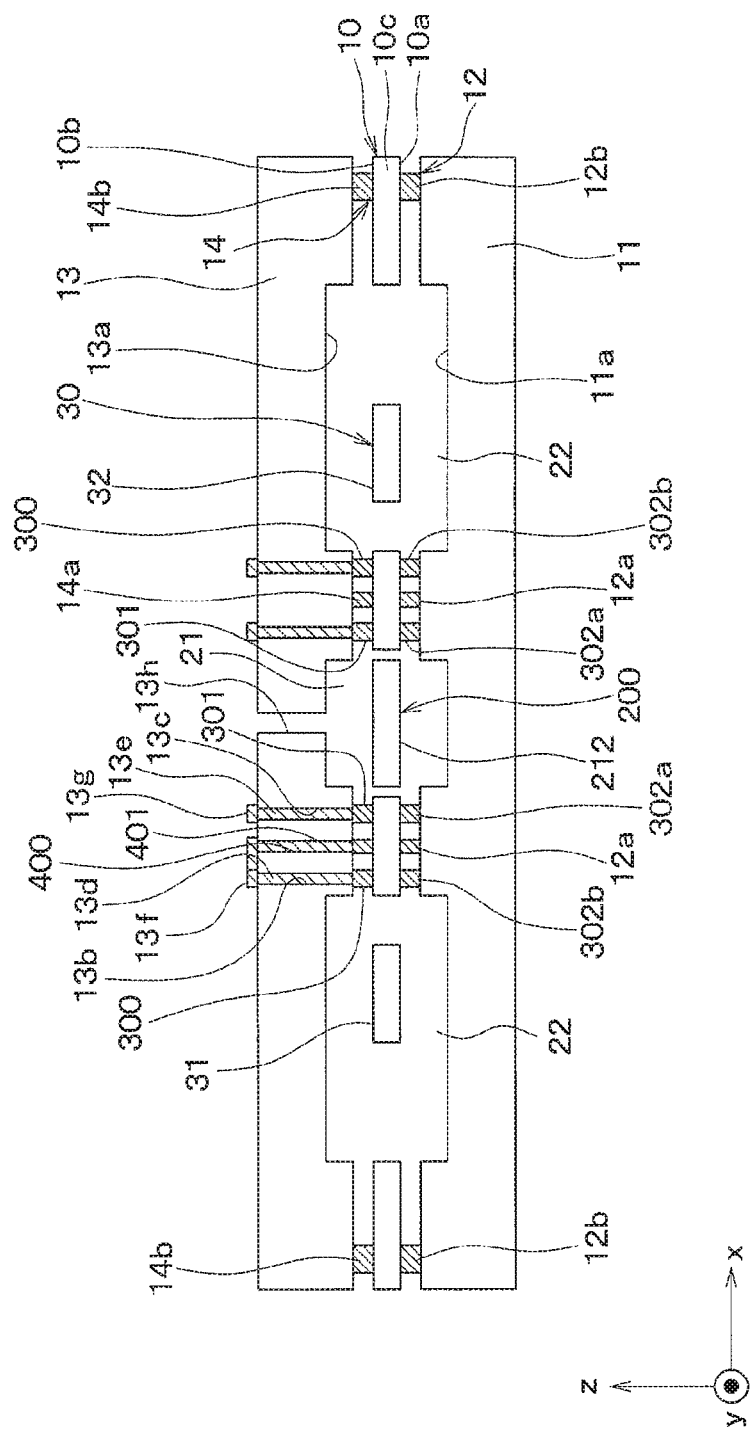
FIG. 8 is a schematic cross sectional view showing a sensor device according to a modification of the present disclosure.

In the above embodiment, the sensor base plate 10 is connected to the supporting plate 11 and the cap layer 13 via the respective plate connecting portions 12 (12*a*, 12*b*) and 14 (14*a*, 14*b*). Each of the plate connecting portions 12 and 14 is made of the insulating film, for example, the silicon dioxide film. Each of the plate connecting portions 12 and 14 may be made of any other material. For example, the plate connecting portions 12 and 14 may be made of metal material to form metal connecting portions. In this case, as shown in FIG. 8, a through-hole 400 is formed in the cap layer 13 and the plate connecting portion 14 made of the metallic material as well as a TSV 401 for the electrical connection is formed in the through-hole 400. The pad portion 13*f* is connected to a ground pad portion, which is connected to the ground.

What is claimed is:

1. A sensor device comprising;
a supporting plate; and
a sensor base plate,
wherein the sensor base plate comprises;
an oscillation type angular velocity sensor; and
an outer frame portion surrounding the oscillation type angular velocity sensor and fixed to the supporting plate,
wherein the oscillation type angular velocity sensor comprises;
a fixed base portion fixed to the supporting plate;
a movable portion having a driving weight and a detecting weight; and
a beam portion having a driving beam and a detecting beam, the driving beam connecting the driving weight to the fixed base portion and supporting the driving weight in such a way that the driving weight is movable on a plane parallel to a surface of the supporting plate, and the detecting beam connecting the detecting weight to the fixed base portion and supporting the detecting weight in such a way that the detecting weight is movable on the plane parallel to the surface of the supporting plate, and
wherein the fixed base portion is formed in a frame shape so as to form an inner frame portion and a dynamic quantity sensor is formed in the sensor base plate at a position inside of the inner frame portion.

2. The sensor device according to claim 1,
wherein a width of the fixed base portion is made to be larger than a width of the detecting beam.

3. The sensor device according to claim 1, wherein
each of the supporting plate and the sensor base plate is made of an independent substrate from each other, and the sensor base plate is connected to the supporting plate via a first plate connecting portion.

4. The sensor device according to claim 1, wherein
the supporting plate and the sensor base plate are made in a single semiconductor substrate.

5. The sensor device according to claim 1, wherein
the dynamic quantity sensor is composed of an acceleration sensor.

6. The sensor device according to claim 5, wherein
the acceleration sensor comprises;
a movable electrode movable in a moving direction on the plane parallel to the surface of the supporting plate; and
a fixed electrode fixed to the supporting plate and located at a position opposing to the movable electrode in the moving direction,
wherein a distance between the fixed electrode and the movable electrode in the moving direction is changed when an acceleration is applied to the sensor device, so that the acceleration sensor detects the acceleration based on a change of a capacitance between the fixed electrode and the movable electrode.

7. The sensor device according to claim 6, wherein
the acceleration sensor is connected to an inner peripheral wall of the fixed base portion and comprises;
a flexible portion being capable of deforming in the moving direction; and
a weight portion connected to the flexible portion,
wherein the movable electrode is connected to the weight portion so as to extend in a direction perpendicular to the moving direction.

8. The sensor device according to claim 5, wherein
a cap layer arranged on a side of the sensor base plate opposite to the supporting plate and connected to the outer frame portion, and
an air breathing hole is formed in the cap layer at a location corresponding to the acceleration sensor.

9. The sensor device according to claim 1, further comprising;
a cap layer arranged on a side of the sensor base plate opposite to the supporting plate,
wherein the cap layer is connected to the cuter frame portion via a second plate connecting portion.

10. The sensor device according to claim 9, wherein
the second plate connecting portion is made of metal material,
a through-hole is formed in the cap layer and connected to the second plate connecting portion, and
a ground pad portion is formed on the cap layer for connecting the second plate connecting portion to the ground via the through-hole.

* * * * *